(12) United States Patent
Handwerker

(10) Patent No.: US 7,517,257 B2
(45) Date of Patent: Apr. 14, 2009

(54) CONNECTION DEVICE FOR AN ELECTRICAL MACHINE

(75) Inventor: Michael Handwerker, Bischofsheim (DE)

(73) Assignee: Siemens Aktiengesellschaft, Munich (DE)

( * ) Notice: Subject to any disclaimer, the term of this patent is extended or adjusted under 35 U.S.C. 154(b) by 36 days.

(21) Appl. No.: 11/573,863

(22) PCT Filed: Apr. 8, 2005

(86) PCT No.: PCT/EP2005/053856

§ 371 (c)(1),
(2), (4) Date: Aug. 29, 2007

(87) PCT Pub. No.: WO2006/018396

PCT Pub. Date: Feb. 23, 2006

(65) Prior Publication Data

US 2008/0067884 A1    Mar. 20, 2008

(30) Foreign Application Priority Data

Aug. 16, 2004 (DE) .................. 10 2004 039 682

(51) Int. Cl.
*H01R 9/22* (2006.01)
(52) U.S. Cl. ........................... 439/709; 439/221
(58) Field of Classification Search ............... 439/715, 439/712, 709, 171, 174, 221
See application file for complete search history.

(56) References Cited

U.S. PATENT DOCUMENTS

| 3,139,492 | A |   | 6/1964  | Cage |
| 3,210,578 | A |   | 10/1965 | Sherer |
| 4,133,598 | A | * | 1/1979  | Kuntzsch ............... 439/712 |
| 5,408,154 | A |   | 4/1995  | Meiser et al. |
| 7,094,113 | B1 | * | 8/2006 | Hasenour et al. ........... 439/709 |
| 7,303,405 | B2 | * | 12/2007 | Ikeda et al. ............... 439/76.2 |

FOREIGN PATENT DOCUMENTS

| DE | 19 13 399  | 4/1965 |
| DE | 14 88 954  | 8/1972 |
| DE | 196 03 868 | 5/1997 |
| EP | 0 351 272  | 1/1990 |
| EP | 0 829 944  | 3/1998 |
| FR | 2 783 648  | 3/2000 |

\* cited by examiner

*Primary Examiner*—Neil Abrams
*Assistant Examiner*—Phuong Nguyen
(74) *Attorney, Agent, or Firm*—Henry M. Feiereisen; Ursula B. Day

(57) ABSTRACT

The aim of the invention is to reduce the logistical and assembly expenses during the connection of electrical machines. To this end, a connection device is provided with a base body (7) that can be mounted in a terminal box socket (1) of the electrical machine. A plurality of contacts (6) of the electrical machine can be plugged or clipped into said base body (7). Outer contacts can be connected to the base body (7) by means of connection elements (4). Preferably, the connection elements (4) are collected together by a plug housing base body (8) in such a way that a plug-in system is provided by means of the socket base body (7).

12 Claims, 2 Drawing Sheets

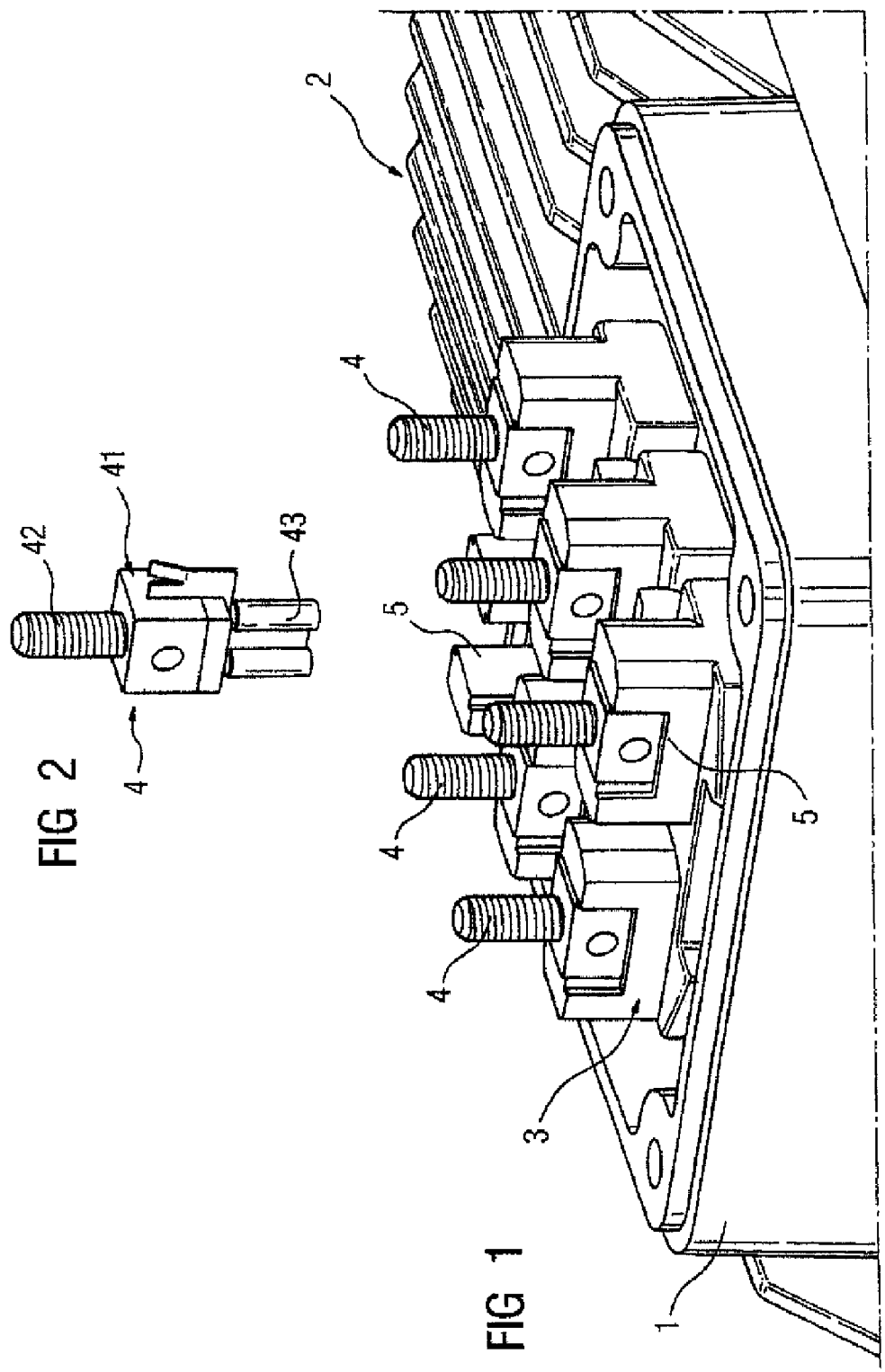

CONNECTION DEVICE FOR AN ELECTRICAL MACHINE

BACKGROUND OF THE INVENTION

The present invention relates to a connection device for an electrical machine and in particular for electric motors.

For different types of use of electric motors there are also different requirements placed on the configuration of the electrical connection system. Each of the various connection systems requires in each case completely different connection components. In order to change the type of connection, a high degree of complexity in terms of variance or adapter parts is generally required. This often results in severely increased costs and in many cases requires more installation space, in addition. In many uses, the ideal type of connection can therefore not be used for technical and economic reasons.

Nowadays, motors are typically connected, for example, via terminal boards, in which the motor-side connection contacts and the external connection contacts are in each case screwed on. In accordance with another connection variant, the power and control lines of the motor are routed into an external switchgear cabinet if this is necessary, for example owing to a lack of space.

Since the different types of motors generally each have different power and control lines, there is a high degree of so-called internal variance for the electric motors. Furthermore, the large number of possibilities for external connections results in a high degree of external variance. The combination of the internal variances and the external variances results in a very high number of possible connection systems. This not only increases the logistical complexity, but also the fitting complexity for the connection systems.

Document DE 196 03 868 C1 has disclosed a clamping plate for an electric motor which receives connection pins for cable lugs, links or nuts. The clamping plate is accommodated in a connection housing of the electric motor.

Furthermore, document EP 0 829 944 A2 has disclosed a connection for an electric motor of a washing machine. A plug-in connector is fixed to the winding of the motor. A plug having a plurality of contacts which are insulated from one another can be inserted into the plug-in connector. In this case, the contacts may be in the form of flat contacts.

In addition, document DE 1 488 945 B has disclosed a terminal box for electrical machines which has a plurality of openings for power lines and control lines.

Finally, document DE 1 913 399 U describes a cuboid terminal box for an electric motor, five walls of the terminal box being provided with openings which are identical to one another and can be terminated as desired by a cable entry, a particular switching member or a cover.

SUMMARY OF THE INVENTION

The object of the present invention consists in proposing a connection device which reduces the logistical complexity and the fitting complexity in comparison with known systems.

According to the invention, this object is achieved by a connection device for an electrical machine having a socket base body, which can be fitted into a terminal box socket of the electrical machine and can be plugged or snapped into the plurality of contacts of the electrical machine and can be connected to the external contacts, and having a plug housing base body, to which external contacts can be connected, the socket base body being a first plug-in element of a plug-in system, the plug housing base body as the second plug-in element being capable of being plugged or snapped onto said first plug-in element, and the plug housing base body being capable of being plugged onto the socket base body in four positions, which are in each case rotated through 90°, the socket base body maintaining its position with respect to the terminal box socket.

The invention therefore provides a universal connection concept for electric motors which makes it possible to realize the various connection possibilities (terminal board, plug, routed-out line, etc.) by a construction kit system having as few components as possible. The plug-in system takes into account not only the internal but also the external variance in connection systems.

In particular, the plug housing can be fitted onto the terminal box socket of an electrical machine in four positions, which are in each case rotated through 90°, the base body maintaining its position with respect to the terminal box socket. A relevant VIK (Association of Industrial Energy and Power Efficiency) requirement is therefore met.

In accordance with one preferred embodiment of the connection device according to the invention, connection elements for the external contacts can be snapped into the base body. This makes it possible for the external contacts to be connected in a very simple manner.

The connection elements may each have a threaded bolt for fixing an external contact. The threaded bolts or screw terminals represent widely distributed connection possibilities.

The contacts of the electrical machine are advantageously flat plugs or similar contacts which can be snapped into the base body or connection elements located therein. As a result, the machine-side contacts can easily be connected to the base body before it is fitted into the terminal box socket of the electrical machine.

In accordance with one advantageous development of the connection device according to the invention, a plug housing or terminal box housing having a first opening for power lines and a separate, second opening for control lines is fitted onto the terminal box socket of an electrical machine such that it can be removed. In this manner, interference signals in the control lines, which may be brought about by the power lines, can largely be avoided.

The plug housing or terminal box housing can also be fitted onto the terminal box socket in accordance with EMC guidelines. The connection device can therefore also be used for converter operation.

BRIEF DESCRIPTION OF THE DRAWING

The present invention will now be explained in more detail with reference to the attached drawings, in which:

FIG. 1 shows a plug-in system;

FIG. 2 shows a connection element for the plug-in system shown in FIG. 1; and

DETAILED DESCRIPTION OF PREFERRED EMBODIMENTS

Figure 3:
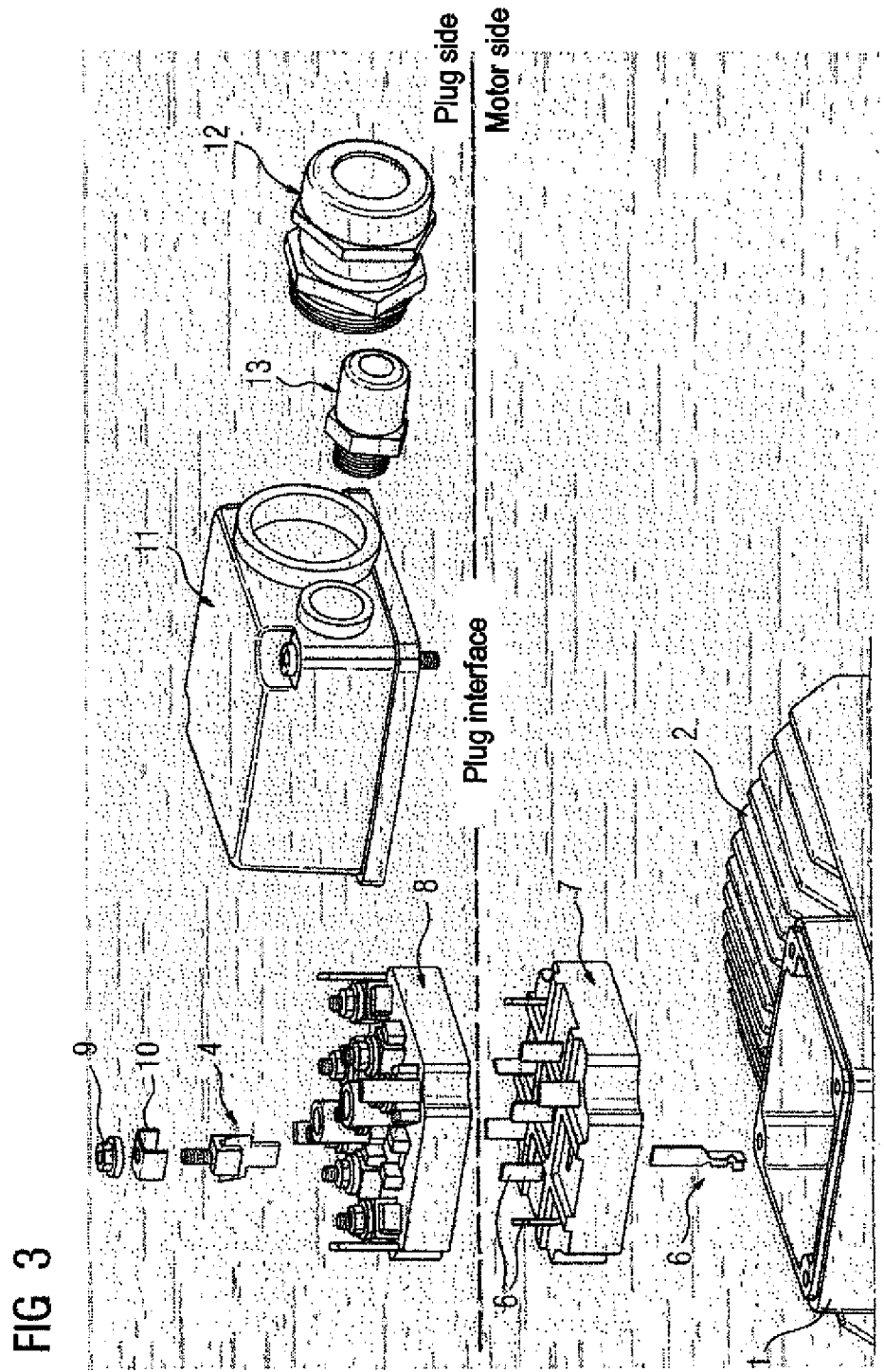
FIG. 3 shows an exploded illustration of a connection device in accordance with one embodiment of the present invention.

The exemplary embodiments described in more detail below represent preferred embodiments of the present invention.

The connection system illustrated in FIG. 1 represents, in terms of the connection principle, a preliminary stage of the present invention and is installed in a terminal box socket 1 of a motor housing 2. It comprises a terminal board base body 3, into which connection elements 4 are plugged or can be plugged. For this purpose, the terminal board base body 3 has corresponding female connectors 5.

FIG. 2 illustrates the connection element 4 in the unplugged state. In the present case, it has a cuboid central section 41, at which a threaded bolt 42 is located. A flat plug-in sleeve 43 is fixed into that side of the central section 41 which is opposite the threaded bolt 42.

In the present, typical case, six connections are provided for the motor illustrated. The terminal board base body 3 may also have any other desired number of connection possibilities, however.

In order to attach an external contact (for example a contact lug) or an external line to the connection element 4, a contact bracket (not illustrated in FIG. 2) is screwed onto the threaded bolt 42 with the aid of a nut (likewise not illustrated) and the line or the contact is thus clamped (cf. FIG. 3).

On the motor side, the connection is made by virtue of blade contacts (not illustrated in FIG. 1), which are fixed to the winding wires or control lines etc. of the motor, being plugged into the flat plug-in sleeve 43 of the connection element 4. Then, the terminal board base body 3 is fixed in the terminal box socket 1 with the aid of two screws, for example.

The fitting of the cable lugs, contact brackets and nuts onto the threaded bolt of the connections which is required in the prior art is therefore no longer necessary for the manufacturer. The contact brackets, links for motor circuits and nuts for the connection of feed lines can be enclosed in a bag when the motor is sold. The customer then does not need to dismantle these elements from the terminal box in order to connect the motor.

One embodiment of a connection system according to the invention is illustrated in FIG. 3. The motor-side connections are identical to those in FIG. 1. Thus, the winding wires (not illustrated), each having a blade contact 6, are routed into the terminal box socket 1 of the motor 2 in this case, too. It is possible to fit a socket base body 7 into the terminal box socket 1. The blade contacts 6 of the motor are snapped into this socket base body 7 from below, with the result that they protrude upwards out of the socket base body 7 and are used as plug contacts. In this case, too, the socket base body 7 is fitted once the blade contacts 6 of the winding wires and control lines of the motor have been snapped into the terminal box socket 1. In addition to the winding wires and signal lines, it is naturally also possible for grounding cables and heating strips or the like to be connected to the socket base body, which represents a motor-side plug part. As an alternative to the blade contacts, pin contacts can also be used, for example.

The motor-side plug part or the socket base body 7 opens up the possibility for a universal connection concept. That is to say the customer can plug a plug housing base body 8 meeting his individual requirements onto the socket base body 7. The plug housing 11 is capable of a 4×90° rotation in accordance with a VIK requirement. A corresponding number of connection elements 4 are plugged into the upper side of the plug housing base body 8, as are illustrated in FIG. 2. In the present case, nine connection elements 4 can be plugged into the plug housing base body 8. A contact bracket 10 for a contact lug (not illustrated) can be screwed onto such a connection element 4 with the aid of a nut 9.

During the process of plugging the plug housing base body 8 into the socket base body 7, the blade contacts 6 are snapped into the connection elements 4. The user can fix the desired motor circuitry (star connection, delta connection, etc.) himself on the plug housing base body 8, as in the case of the terminal board solution illustrated in FIG. 1.

For the external connections, other connection elements having other conventional connection principles, such as screw connection or screw terminal connection, tension spring connection, direct connection, crimping connection, quick connection via insulation displacement contacts, soldered or welded joint, cable lug connection, etc., can also be provided on the plug housing base body 8.

The terminal box socket 1, as has already been mentioned above, is closed by a plug housing 11, which has the capability of a 4×90° rotation. The power connection lines are routed via a first screw connection 12 and the signal lines are routed via a second screw connection 13 into the plug housing 11. As a result, faults in the signal lines are avoided by the power lines.

In order to cover a use spectrum which is as broad as possible, the plug housing 11 is ideally formed from an aluminum pressure diecast or a material having comparable strength and electrical properties. Since, in addition, the plug housing 11 makes metallic contact circumferentially on the terminal box socket 1, a low-resistance connection is ensured. The connection system when using EMC screw connections for the connection lines thus meets EMC guidelines and can therefore also be used for converter operation.

The essence of the two embodiments illustrated above of universal connection systems according to the invention consists in the terminal box socket on the motor housing 2 and the connection elements (for example blade or pin contacts by means of hot-crimping), which ideally have been contact-connected directly to the winding wires or heating strips, PTC thermistors, bimetallic strips 0etc. A lower terminal box part (not illustrated) having an additional cover, a plug housing 11, a cover element (likewise not illustrated in FIG. 3), for example for wiring systems in an external switchgear cabinet, or the like can be fitted on the terminal box socket 1 all with identical sealing and fixing elements. In this case, the capability of a 4×90° rotation can be provided in all variants.

In place of the socket base body 7 illustrated in FIG. 3 or the terminal board base body 3 illustrated in FIG. 1, a standardized top-hat rail, for example, can also be used in the terminal box socket 1 as the fixing element on which connection elements are screwed or snapped. In this case, as has already been indicated, the widest variety of pairings (on the part of the motor and the customer) of connection principles are possible using the connection elements (plugs, insulation displacement, crimping, welding, soldering, cable lugs, screwing, clamping etc.).

In order to make universal usability possible given, at the same time, a low component variance, the following points are of importance:

a) The connection elements 4 on the terminal board base body 3 and on the plug housing base body 8 should be selected to be identical. The contact links for star connection or delta connection of the motor should also be selected to be identical. For this purpose, the female connector geometry in the terminal board base body 3 and in the plug housing base body 8 also need to be identical if the connection elements 4 are designed to be capable of being plugged in.

b) The flat plug 6 or other contact elements of the electrical machine, which are ideally connected directly to the motor-side winding wires, signal lines etc., should likewise be designed to be identical. They then fit, in the terminal board embodiment, into the corresponding connection element 4 in the terminal board base body 3 and, in the plug embodiment, form the motor-side plug contacts 6, which can be plugged into the socket base body 7.

c) The interface and the sealing elements between the terminal box socket 1 and the plug housing 11 or a cover plate or the like should be uniform.
d) A uniform thread dimension for the connection screws should be provided in the terminal box embodiment, the plug embodiment and the cover plate embodiment.
e) The base body in the terminal box socket 1 on the motor is either in the form of a terminal board base body 3 or in the form of a socket base body.
f) The terminal box, plug housing 11 and cover plate are designed in the standard embodiment in accordance with EMC guidelines.
g) The plug-in system merely comprises the two plug-in base bodies 7 and 8 and the plug housing 11, it being possible to dispense with a second plug housing half since this is formed by the terminal box socket.
h) The capability of a 4×90° rotation of the connection direction should be ensured.

Advantageously, cost-effective standard plugs with closure stoppers can therefore be delivered, for example to wholesalers, and the customer can then himself choose between standard or EMC embodiment with the type of screw connection.

What is claimed is:

1. A connection device for an electrical machine, comprising:
 a socket base body being attached to a terminal box socket of an electrical machine, said socket base body constituting a first plug-in element of a plug-in system;
 a plug housing base body to which external contacts are connectable and which constitutes a second plug-in element being snapped onto the first plug-in element in four positions, which are rotated respectively by 90°, while the socket base body maintains its position with respect to the terminal box socket;
 wherein the socket base body is constructed to enable a plurality of contacts of the electrical machine to be snapped into the socket base body from a bottom side thereof facing the terminal box socket, with the contacts sized to extend upwards beyond the socket base body to act as plug contacts for connection of the external contacts.

2. The connection device of claim 1, wherein the contacts of the electrical machine are constructed as flat plug-in contacts, which is snapped into the socket base body.

3. The connection device of claim 1, further comprising connection elements constructed to snap to the second plug-in element for attachment of the external contacts.

4. The connection device of claim 3, wherein the connection elements have each a threaded bolt or a screw terminal for attachment of an external contact.

5. The connection device of claim 3, wherein each of the connection elements has a cuboid central section having opposite sides, a threaded bolt extending out from one of the sides of the central section for attachment of a respective one of the external contacts, and a plug-in sleeve extending out from the other one of the sides of the central section for acceptance of a respective one of the plurality of contacts.

6. An electrical machine, comprising:
 a terminal box socket;
 a plurality of contacts; and
 a connection device, said connection device including:
  a socket base body being attached to the terminal box socket, said socket base body constituting a first plug-in element of a plug-in system;
  a plug housing base body to which external contacts are connectable and which constitutes a second plug-in element being snapped onto the first plug-in element in four positions, which are rotated respectively by 90°, while the socket base body maintains its position with respect to the terminal box socket;
  wherein the socket base body is constructed to enable the contacts to be snapped into the socket base body from a bottom side thereof facing the terminal box socket, with the contacts sized to extend upwards beyond the socket base body to act as plug contacts for connection of the external contacts.

7. The electrical machine of claim 6, further comprising a member selected from the group consisting of plug housing, terminal box housing, and cover plate, for detachable securement to the terminal box socket, said member having a first opening for guiding power lines, and a separate, second opening for guiding control lines.

8. The electrical machine of claim 6, wherein the contacts are constructed as flat plug-in contacts for connection to the socket base body.

9. The electrical machine of claim 6, wherein each of the contacts has a flat section for acceptance in the socket base body.

10. The electrical machine of claim 6, further comprising connection elements constructed to snap to the second plug-in element for attachment of the external contacts.

11. The electrical machine of claim 10, wherein the connection elements have each a threaded bolt or a screw terminal for attachment of an external contact.

12. The electrical machine of claim 10, wherein each of the connection elements has a cuboid central section having opposite sides, a threaded bolt extending out from one of the sides of the central section for attachment of a respective one of the external contacts, and a plug-in sleeve extending out from the other one of the sides of the central section for acceptance of a respective one of the plurality of contacts.

* * * * *

UNITED STATES PATENT AND TRADEMARK OFFICE
CERTIFICATE OF CORRECTION

PATENT NO.         : 7,517,257 B2                                    Page 1 of 1
APPLICATION NO. : 11/573863
DATED              : April 14, 2009
INVENTOR(S)        : Michael Handwerker It is certified that error appears in the above-identified patent and that said Letters Patent is hereby corrected as shown below:

On the Title Page
    Item [22] PCT Filed: replace "April 8, 2005" with --August 4, 2005--.

Signed and Sealed this

Nineteenth Day of May, 2009

JOHN DOLL
*Acting Director of the United States Patent and Trademark Office*